United States Patent
Welsh et al.

(10) Patent No.: US 11,725,882 B2
(45) Date of Patent: Aug. 15, 2023

(54) COOLING SYSTEM FOR ROTOR HUB MOUNTED COMPONENT

(71) Applicant: LOCKHEED MARTIN CORPORATION, Bethesda, MD (US)

(72) Inventors: William A. Welsh, North Haven, CT (US); Damaris R. Zachos, Lyme, CT (US)

(73) Assignee: LOCKHEED MARTIN CORPORATION, Bethesda, MD (US)

(*) Notice: Subject to any disclaimer, the term of this patent is extended or adjusted under 35 U.S.C. 154(b) by 469 days.

(21) Appl. No.: 16/902,549

(22) Filed: Jun. 16, 2020

(65) Prior Publication Data

US 2021/0389054 A1 Dec. 16, 2021

(51) Int. Cl.
| | | |
|---|---|---|
| F28D 15/00 | (2006.01) | |
| F28D 15/02 | (2006.01) | |
| B64C 27/04 | (2006.01) | |
| B64C 27/32 | (2006.01) | |
| F28D 21/00 | (2006.01) | |

(52) U.S. Cl.
CPC .......... *F28D 15/0275* (2013.01); *B64C 27/04* (2013.01); *B64C 27/32* (2013.01); *F28D 15/0266* (2013.01); *F28D 2021/0021* (2013.01)

(58) Field of Classification Search
CPC ............. F28D 15/0275; F28D 15/0266; F28D 2021/0021; B64C 27/04; B64C 27/32; B64C 27/001; B64C 1/38
See application file for complete search history.

(56) References Cited

U.S. PATENT DOCUMENTS

| | | | |
|---|---|---|---|
| 5,305,973 A * | 4/1994 | Shortland | B64C 1/38 244/119 |
| 9,745,055 B2 | 8/2017 | Heverly, II et al. | |
| 9,776,712 B2 | 10/2017 | Jolly et al. | |
| 9,988,146 B2 | 6/2018 | Welsh | |
| 2010/0026109 A1* | 2/2010 | Hassett | F28D 15/0275 310/64 |
| 2010/0126703 A1* | 5/2010 | Ruan | H02K 5/203 165/104.33 |
| 2013/0058793 A1* | 3/2013 | Schank | B64C 27/72 416/96 A |
| 2015/0316106 A1* | 11/2015 | Jackson | F28D 15/0275 165/104.26 |
| 2018/0362179 A1* | 12/2018 | Finger | F01P 5/06 |
| 2019/0017750 A1 | 1/2019 | Berezin et al. | |
| 2019/0350111 A1* | 11/2019 | Bodla | F28D 15/0233 |
| 2019/0358691 A1* | 11/2019 | Swedberg | B21D 51/26 |
| 2020/0088479 A1* | 3/2020 | Tseng | F28D 15/0275 |

\* cited by examiner

*Primary Examiner* — Travis Ruby
(74) *Attorney, Agent, or Firm* — Foley & Lardner LLP

(57) ABSTRACT

A rotor system including a rotor hub, a plurality of rotor blades supported by the rotor hub, and a fairing mounted to the rotor hub. The fairing includes an external surface exposed to an external airflow and an internal surface defining an interior portion. A component system is mounted to the rotor hub in the interior portion. The component system includes a first heat generating component and a second heat generating component spaced from the first heat generating component. A cooling duct is arranged between the first heat generating component and the second heat generating component.

22 Claims, 3 Drawing Sheets

COOLING SYSTEM FOR ROTOR HUB MOUNTED COMPONENT

BACKGROUND

Exemplary embodiments pertain to the art of rotary wing aircraft and, more particularly, to a cooling system for components mounted on a rotor hub of a rotary wing aircraft.

Rotary wing aircraft include rotor blades that are selectively rotated about a rotor blade axis to adjust flight characteristics. Typically, each rotor blade of a rotor system is connected to a rotor blade actuator which, in turn, may be coupled to a vehicle management system and/or control inceptors. Other components and systems may also be mounted with the rotor blades. For example, many rotor blade assemblies include vibration reduction systems that lower and/or eliminate vibrations that may pass from rotor blades into a fuselage.

In some cases, rotor blade actuators, vibration reduction systems, and other components may be exposed to an airstream passing over or around a rotor hub. In other cases, the rotor blade actuators, vibration reduction system and other components may be enclosed in a fairing. The fairing reduces drag on the rotor hub and blades. The fairing also reduces airflow across the various components which, in turn, can have a detrimental effect on cooling.

BRIEF DESCRIPTION

Disclosed is a rotor system including a rotor hub, a plurality of rotor blades supported by the rotor hub, and a fairing mounted to the rotor hub. The fairing includes an external surface exposed to an external airflow and an internal surface defining an interior portion. A component system is mounted to the rotor hub in the interior portion. The component system includes a first heat generating component and a second heat generating component spaced from the first heat generating component. A cooling duct is arranged between the first heat generating component and the second heat generating component.

In addition to one or more of the features described above, or as an alternative, in further embodiments the first heat generating component includes a first substantially circular body and the second heat generating component includes a second substantially circular body that is disposed radially outwardly of the first heat generating component.

In addition to one or more of the features described above, or as an alternative, in further embodiments one or more scuppers is mounted to one of the first and second heat generating components in the cooling duct, the one or more scuppers being rotated with the one of the first and second heat generating components.

In addition to one or more of the features described above, or as an alternative, in further embodiments the first heat generating component comprises a first electric motor and the second heat generating component comprises a second electric motor.

In addition to one or more of the features described above, or as an alternative, in further embodiments a heat pipe is arranged between the first heat generating component and the second heat generating component.

In addition to one or more of the features described above, or as an alternative, in further embodiments the heat pipe includes one or more coils that are thermally connected to each of the first heat generating component and the second heat generating component.

In addition to one or more of the features described above, or as an alternative, in further embodiments at least one of the first heat generating component and the second heat generating component includes a plurality of windings, the cooling duct including a plurality of cooling ducts at least one of which is arranged between adjacent ones of the windings, wherein the heat pipe is arranged in each of the plurality of cooling ducts.

In addition to one or more of the features described above, or as an alternative, in further embodiments a radiator is mounted to the fairing and thermally connected with the heat pipe.

In addition to one or more of the features described above, or as an alternative, in further embodiments the radiator is mounted to the internal surface of the fairing.

In addition to one or more of the features described above, or as an alternative, in further embodiments one or more cooling saddles extend between the heat pipe and the radiator.

Also disclosed is a rotary wing aircraft including an airframe having an extending tail, a tail rotor system arranged at the extending tail, and a main rotor system coupled to the airframe. The main rotor system includes a rotor hub, a plurality of rotor blades supported by the rotor hub, and a fairing mounted to the rotor hub. The fairing includes an external surface exposed to an external airflow and an internal surface defining an interior portion. A component system is mounted to the rotor hub in the interior portion. The component system includes a first heat generating component and a second heat generating component spaced from the first heat generating component. A cooling duct is arranged between the first heat generating component and the second heat generating component.

In addition to one or more of the features described above, or as an alternative, in further embodiments the first heat generating component includes a first substantially circular body and the second heat generating component includes a second substantially circular body that is disposed radially outwardly of the first heat generating component.

In addition to one or more of the features described above, or as an alternative, in further embodiments one or more scuppers is mounted to one of the first and second heat generating components in the cooling duct, the one or more scuppers being rotated with the one of the first and second heat generating components.

In addition to one or more of the features described above, or as an alternative, in further embodiments the first heat generating component comprises a first electric motor and the second heat generating component comprises a second electric motor.

In addition to one or more of the features described above, or as an alternative, in further embodiments a heat pipe is arranged between the first heat generating component and the second heat generating component.

In addition to one or more of the features described above, or as an alternative, in further embodiments the heat pipe includes one or more coils that are thermally connected to each of the first heat generating component and the second heat generating component.

In addition to one or more of the features described above, or as an alternative, in further embodiments at least one of the first heat generating component and the second heat generating component includes a plurality of windings, the cooling duct including a plurality of cooling ducts at least one of which is arranged between adjacent ones of the windings, wherein the heat pipe is arranged in each of the plurality of cooling ducts.

In addition to one or more of the features described above, or as an alternative, in further embodiments a radiator is mounted to the fairing and thermally connected with the heat pipe.

In addition to one or more of the features described above, or as an alternative, in further embodiments the radiator is mounted to the internal surface of the fairing.

In addition to one or more of the features described above, or as an alternative, in further embodiments one or more cooling saddles extend between the heat pipe and the radiator.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
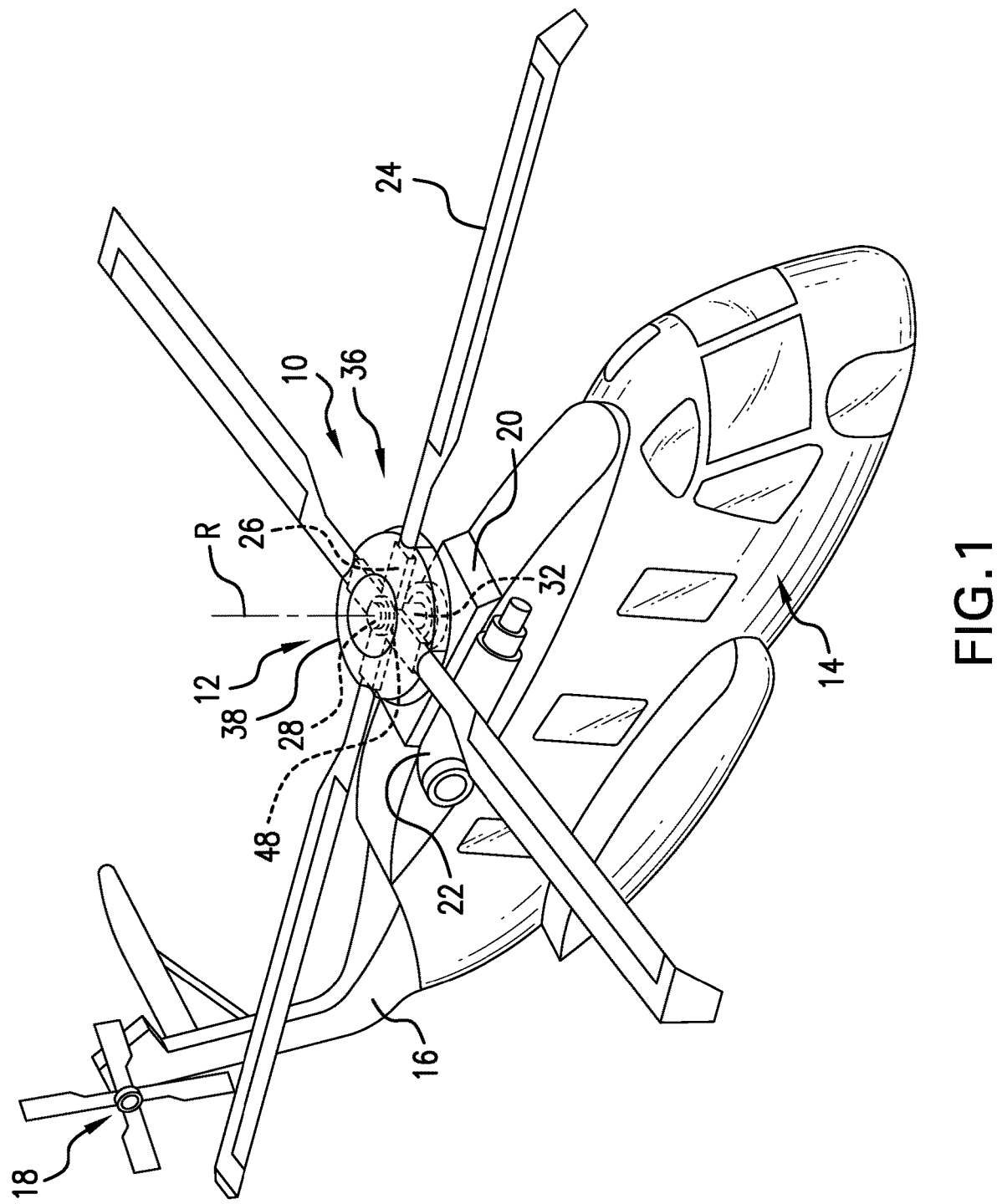
FIG. 1 depicts a rotary wing aircraft including a cooling system, in accordance with an exemplary aspect.

FIG. 1 depicts a vertical takeoff and landing (VTOL) aircraft 10 including a main rotor system 12 that rotates about a main rotor axis R. Aircraft 10 includes an airframe 14 having an extended tail 16 that supports a tail rotor system 18. Main rotor system 12 is coupled to a main rotor gear box 20 that may be driven by one or more prime movers such as engine 22. Main rotor system 12 includes a plurality of rotor blades, one of which is indicated at 24 that are rotated about main rotor axis "R".

Each rotor blade 24 includes a hub end portion 26 that is coupled to a rotor hub 28 that is connected to main rotor gear box 20 through a shaft 32. At this point, it should be understood that VTOL aircraft 10 may also be configured as a dual rotor system or any other rotor system having an enclosed hub. It is to be further understood that tail rotor system 18 may take on a variety of forms including those providing propulsion. That is, it should be noted that tail rotor system may also take the form of a translational thrust system.

Figure 2:
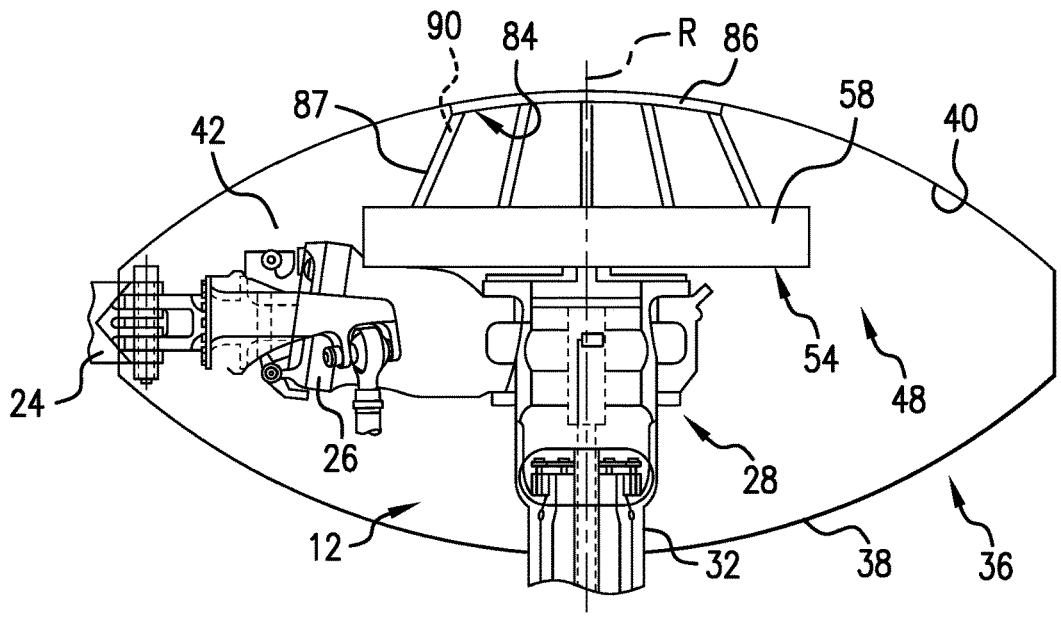
FIG. 2 depicts a heat generating component and cooling system mounted in a fairing of a hub portion of the rotary wing aircraft, of FIG. 1, in accordance with an exemplary aspect.

Referring to FIG. 2 and with continued reference to FIG. 1, rotor hub 28 is surrounded by a fairing 36 that provides aerodynamic enhancement to main rotor system 12. Fairing 36 includes an external surface 38 and an internal surface 40 that defines an interior portion 42. A component system 48 is coupled to rotor hub 28 within interior portion 42. Component system 48 may take the form of a vibration suppression system 54 including an annular electric motor system 58. Vibration suppression system 54 is coupled to a controller (not shown) that selectively activates annular electric motor system 58 in order to reduce vibration caused by rotor blades 24 at various speed levels.

Figure 3:
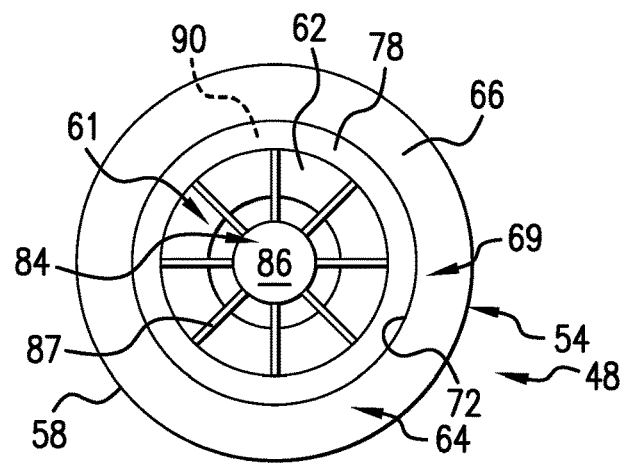
FIG. 3 depicts a top view of the heat generating component and a portion of the cooling system of FIG. 2.

In accordance with an exemplary aspect depicted in FIG. 3, annular electric motor system 58 includes a first heat generating component 61 that may take the form of a first electric motor 62 and a second heat generating component 64, that may take the form of a second electric motor 66 that is disposed radially outwardly of and spaced from first electric motor 62. A cooling system 69 is arranged in a cooling duct 72 arranged between first electric motor 62 and second electric motor 66.

Figure 4:
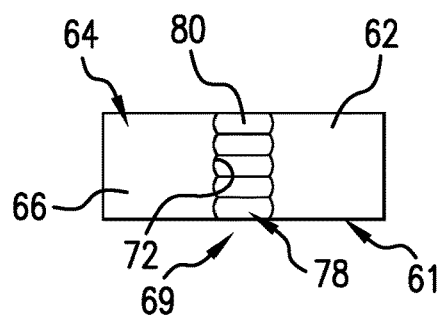
FIG. 4 is a partial cross-sectional view of the heat generating component of FIG. 3, in accordance with an aspect of an exemplary embodiment.

In an embodiment, cooling system 69 includes one or more heat pipes 78 that absorb heat from first electric motor 62 and second electric motor 66. Heat pipe 78 may wrap around second electric motor 66 forming a plurality of coils, one of which is shown at 80 in FIG. 4. Of course, it should be understood, that heat pipe 78 may comprise multiple heat pipes that either extend about or through cooling duct 72. At this point, the term "heat pipe" should be understood to describe a heat transfer device that combines thermal conductivity principles and phase transition principles to manage a transfer of heat between two bodies.

In accordance with an exemplary aspect, heat pipe 78 is connected to a heat exchanger 84 that may take the form of a radiator 86 mounted to internal surface 40 of fairing 36. One or more cooling saddles or conduits 87 may extend from heat pipe 78 to radiator 86. In operation, a cooling fluid 90, which may be in the form of a liquid may flow from heat pipe 78 to heat exchanger 84 to exchange heat with ambient and flow back to heat pipe 78.

More specifically, cooling fluid 90 contained in heat pipe 78 exchanges heat with first and second electric motors 62 and 64 and may transform into a vapor. The vapor passes to heat exchanger 84 to exchange heat with ambient airflows in interior portion 42. Alternatively, a portion of heat exchanger 84 may be exposed to external surface 38. In heat exchanger 84, the vapor transforms back to a liquid through a heat exchange with ambient and is passed back to heat pipe 78. The liquid flows back to electric motors 62 and 64 due to centrifugal forces causing the condensed vapor to flow outward radially through connections 87. In this manner, cooling system 69 may reduce localized temperatures at each of the first and second electric motors 62 and 64 without the need to create openings in fairing 36 which could create undesirable drag. Further, the above described system provides a closed loop cooling system that does not require electrical connections or external power to guide cooling fluid between two heat exchangers.

Figure 5:
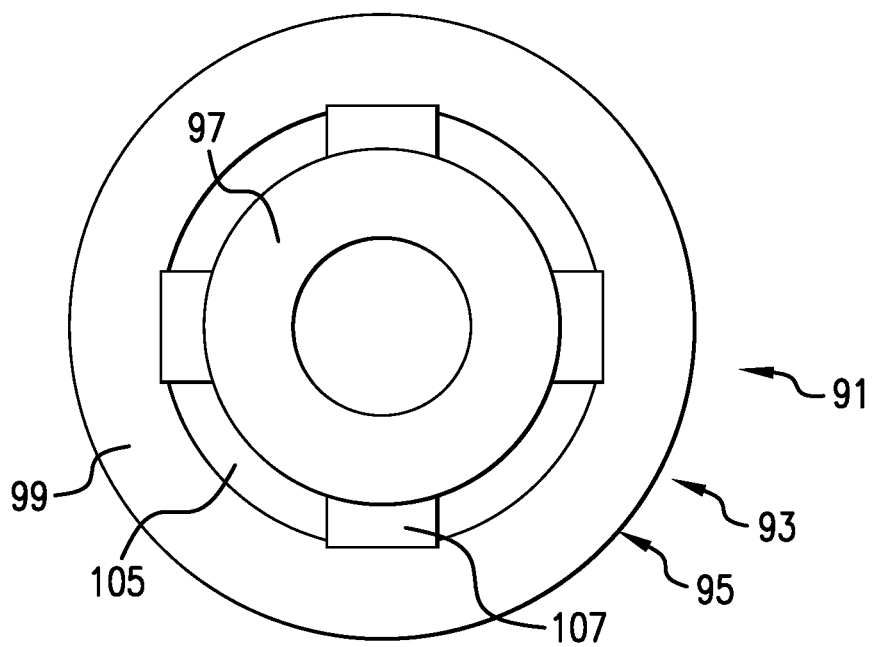
FIG. 5 depicts a top view of the heat generating component and cooling system, in accordance with another aspect of an exemplary embodiment.

Reference will now follow to FIG. 5, in describing a component system 91 in accordance with another exemplary aspect. Component system 91 may take the form of a vibration suppression system 93 including an annular electric motor system 95. Annular electric motor system 95 includes a first heat generating component, that may take the form of a first electric motor 97 and a second heat generating component, which may take the form of a second electric motor 99. Second electric motor 99 is arranged radially outwardly of and spaced from first electric motor 97. A cooling duct 105 is arranged between first electric motor 97 and second electric motor 99.

In an embodiment, cooling duct 105 provides a heat exchange zone between first electric motor 97 and second electric motor 99. Heat generated by first and second electric motors 97 and 99 may be exchanged with air currents flowing through cooling duct 105. The air currents may pass from fairing 36 through an open lower portion or through vents (not shown). In an embodiment, scuppers or vanes, one of which is shown at 107 may be mounted to first electric motor 97 and extend across cooling duct 105. Scuppers 107 may revolve with first electric motor 97 creating cooling air currents that transport heat away from component system 91. Although described as being mounted to first electric motor 97, it should be understood that scuppers 107 could, in the alternative, be mounted to second electric motor 99. Scuppers 107 could, in an alternative, be mounted to fairing 36. In this alternative arrangement, scuppers 107 may direct air from fairing 36.

Figure 6:
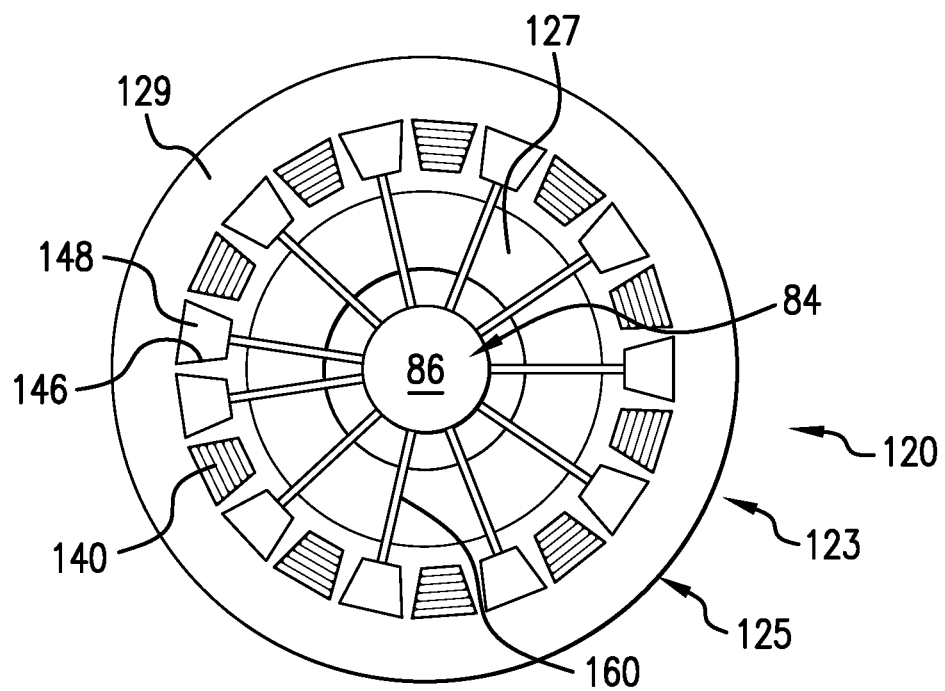
FIG. 6 depicts a top view of the heat generating component and cooling system, in accordance with yet another aspect of an exemplary embodiment.

Reference will now follow to FIG. 6, in describing a component system 120 in accordance with another exemplary aspect. Component system 120 may take the form of a vibration suppression system 123 including an annular electric motor system 125. Annular electric motor system 125 includes a first heat generating component, that may take the form of a first electric motor 127 and a second heat generating component, which may take the form of a second electric motor 129. Second electric motor 129 is arranged radially outwardly of and spaced from first electric motor 127.

In accordance with an exemplary embodiment, second electric motor 129 may include a plurality of motor windings, one of which is indicated at 140. A plurality of cooling ducts, one of which is indicated at 146 are arranged between adjacent ones of motor windings 140. In an embodiment, there may be one or more cooling ducts arranged between adjacent ones of motor windings 140. The number and location of cooling ducts may vary and could depend on localized heat loads on component system 120.

In further accordance with an exemplary embodiment, a heat pipe 148 may be arranged in each cooling duct 146. Each heat pipe 148 may be fluidically connected to heat exchanger 84 through a corresponding cooling saddle 160. Of course, it should be understood that in lieu of multiple heat pipes a single heat pipe may be employed, or heat pipes may be shared between, for example, two adjacent cooling ducts 146. In such a case, the shared heat pipe may also share a corresponding cooling saddle 160. An upper end (not separately labeled) of cooling saddle 160 is connected to heat exchanger 84 at a maximum radius to avoid trapping condensed fluid which may not flow due to centrifugal forces back to the cooling ducts 146.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The terms "about" and "substantially" are intended to include the degree of error associated with measurement of the particular quantity based upon the equipment available at the time of filing the application. For example, "about" and/or "substantially" can include a range of ±8% or 5%, or 2% of a given value.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A rotor system comprising:
   a rotor hub;
   a plurality of rotor blades supported by the rotor hub;
   a fairing mounted to the rotor hub, the fairing including an external surface exposed to an external airflow and an internal surface defining an interior portion;
   a component system mounted to the rotor hub in the interior portion, the component system including a first annular motor and a second annular motor spaced apart from and concentric with the first annular motor; and
   an annular cooling duct arranged between the first annular motor and the second annular motor.

2. The rotor system according to claim 1, wherein the first annular motor includes a first substantially circular body and the second annular motor includes a second substantially circular body that is disposed radially outwardly of the first annular motor.

3. The rotor system according to claim 2, further comprising: one or more scuppers mounted to one of the first and second annular motors in the annular cooling duct, the one or more scuppers being rotated with the one of the first and second annular motors.

4. The rotor system according to claim 2, wherein the first annular motor is an electric motor and the second annular motor is an electric motor.

5. The rotor system according to claim 1, further comprising: a heat pipe positioned in the annular cooling duct.

6. The rotor system according to claim 5, wherein the heat pipe includes one or more coils that are thermally connected to each of the first annular motor and the second annular motor.

7. The rotor system according to claim 5, wherein at least one of the first annular motor and the second annular motor includes a plurality of windings, the annular cooling duct including a plurality of cooling ducts at least one of which is arranged between adjacent ones of the windings, wherein the heat pipe is arranged in each of the plurality of cooling ducts.

8. The rotor system according to claim 5, further comprising: a radiator mounted to the fairing and thermally connected with the heat pipe.

9. The rotor system according to claim 8, wherein the radiator is mounted to the internal surface of the fairing.

10. The rotor system according to claim 8, further comprising: one or more cooling saddles extending between the heat pipe and the radiator.

11. The rotor system of claim 1, further comprising:
    a heat pipe including one or more annular coils in the annular cooling duct that are thermally connected on a first surface of the one or more annular coils to the first annular motor and on a second surface of the one or more annular coils to the second annular motor,
    wherein the annular motor includes a first substantially circular body and the second annular motor includes a second substantially circular body that is disposed radially outwardly of the first annular motor and concentric with the first annular motor.

12. A rotary wing aircraft comprising:
an airframe including an extending tail;
a tail rotor system arranged at the extending tail; and
a main rotor system coupled to the airframe, the main rotor system comprising:
   a rotor hub;
   a plurality of rotor blades supported by the rotor hub;
   a fairing mounted to the rotor hub, the fairing including an external surface exposed to an external airflow and an internal surface defining an interior portion;
   a component system mounted to the rotor hub in the interior portion, the component system including a first annular motor and a second annular motor spaced apart from and concentric with the first annular motor; and
   an annular cooling duct arranged between the first annular motor and the second annular motor.

13. The rotary wing aircraft according to claim 12, wherein the second annular motor is disposed radially outwardly of the first annular motor.

14. The rotary wing aircraft according to claim 13, further comprising: one or more scuppers mounted to one of the first and second annular motors in the annular cooling duct, the one or more scuppers being rotated with the one of the first and second annular motors.

15. The rotary wing aircraft according to claim 13, wherein the first annular motor is an electric motor and the second annular motor is an electric motor.

16. The rotary wing aircraft according to claim 12, further comprising: a heat pipe positioned in the annular cooling duct.

17. The rotary wing aircraft according to claim 16, wherein the heat pipe includes one or more coils that are thermally connected to each of the first annular motor and the second annular motor.

18. The rotary wing aircraft according to claim 16, wherein at least one of the first annular motor and the second annular motor includes a plurality of windings, the annular cooling duct including a plurality of cooling ducts, at least one of which is arranged between adjacent ones of the windings, wherein the heat pipe is arranged in each of the plurality of cooling ducts.

19. The rotary wing aircraft according to claim 16, further comprising: a radiator mounted to the fairing and thermally connected with the heat pipe.

20. The rotary wing aircraft according to claim 19, wherein the radiator is mounted to the internal surface of the fairing.

21. The rotary wing aircraft according to claim 19, further comprising: one or more cooling saddles extending between the heat pipe and the radiator.

22. The rotary wing aircraft of claim 12, wherein:
   the main rotor system further comprises a heat pipe including one or more annular coils in the annular cooling duct that are thermally connected on a first surface of the one or more annular coils to the first annular motor and on a second surface of the one or more annular coils to the second annular motor; and
   the annular motor includes a first substantially circular body and the second annular motor includes a second substantially circular body that is disposed radially outwardly of the first annular motor and concentric with the first annular motor.

* * * * *